United States Patent
Aarestrup et al.

(10) Patent No.: US 8,698,445 B2
(45) Date of Patent: Apr. 15, 2014

(54) METHOD FOR ACTIVATING AN ASYNCHRONOUS MOTOR

(75) Inventors: Jan Caroe Aarestrup, Bjerringbro (DK); Jens Engen Soerensen, Rancho Palos Verdes, CA (US); Klaus Sloth Jensen, Mariager (DK)

(73) Assignee: Grundfos Management a/s, Bjerringbro (DK)

(*) Notice: Subject to any disclaimer, the term of this patent is extended or adjusted under 35 U.S.C. 154(b) by 415 days.

(21) Appl. No.: 12/671,727

(22) PCT Filed: Jul. 25, 2008

(86) PCT No.: PCT/EP2008/006103
§ 371 (c)(1), (2), (4) Date: Feb. 2, 2010

(87) PCT Pub. No.: WO2009/015826
PCT Pub. Date: Feb. 5, 2009

(65) Prior Publication Data
US 2011/0187306 A1  Aug. 4, 2011

(30) Foreign Application Priority Data
Aug. 2, 2007  (EP) .................................. 07015155

(51) Int. Cl.
*H02P 27/02* (2006.01)
*H02P 23/00* (2006.01)

(52) U.S. Cl.
USPC ............................ 318/772; 318/779; 318/781

(58) Field of Classification Search
USPC ................... 318/772, 778, 779, 781, 785–793
See application file for complete search history.

(56) References Cited

U.S. PATENT DOCUMENTS

| | | | | |
|---|---|---|---|---|
| 3,116,445 A * | 12/1963 | Wright | ........................... | 318/786 |
| 3,414,789 A * | 12/1968 | Prouty | ........................... | 318/786 |
| 3,510,741 A * | 5/1970 | Frank | ........................... | 318/786 |
| 3,528,103 A * | 9/1970 | Wolf | ........................... | 318/754 |
| 3,573,579 A * | 4/1971 | Lewus | ........................... | 318/787 |
| 3,582,737 A * | 6/1971 | Brown et al. | ........................... | 318/812 |
| 3,671,830 A * | 6/1972 | Kruper | ........................... | 318/786 |
| 3,746,951 A * | 7/1973 | Hohman | ........................... | 318/786 |
| 3,819,994 A * | 6/1974 | Ballman | ........................... | 318/786 |
| 3,882,364 A * | 5/1975 | Wright et al. | ........................... | 318/786 |
| 4,103,212 A * | 7/1978 | Spradling | ........................... | 318/776 |
| 4,145,646 A * | 3/1979 | Werderitch | ........................... | 318/782 |
| 4,463,304 A * | 7/1984 | Miller | ........................... | 318/790 |
| 5,146,146 A * | 9/1992 | Samann | ........................... | 318/768 |
| 5,159,255 A * | 10/1992 | Weber | ........................... | 318/775 |
| 5,696,432 A | 12/1997 | Poeppel | | |
| 5,734,248 A * | 3/1998 | Kemp et al. | ........................... | 318/772 |
| 6,208,113 B1 | 3/2001 | Lelkes et al. | | |

FOREIGN PATENT DOCUMENTS

| | | |
|---|---|---|
| DE | 40 31 708 A1 | 4/1992 |
| DE | 195 35 676 A1 | 4/1996 |
| EP | 0 989 666 A1 | 3/2000 |
| EP | 1 646 140 A2 | 4/2006 |

* cited by examiner

*Primary Examiner* — Bentsu Ro
(74) *Attorney, Agent, or Firm* — Panitch Schwarze Belisario & Nadel LLP

(57) ABSTRACT

The method for activating an asynchronous motor comprising at least two windings is provided, in order, for the purpose of a change in the rotational speed, to connect a first winding and at least one second winding by way of at least two electronic switches. On switching, both switches are opened for one or more time intervals in order to avoid current peaks.

14 Claims, 4 Drawing Sheets

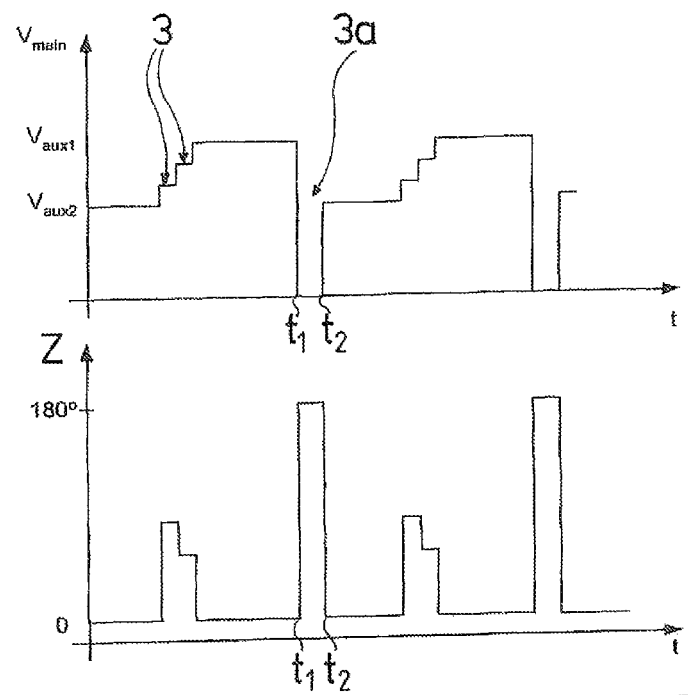
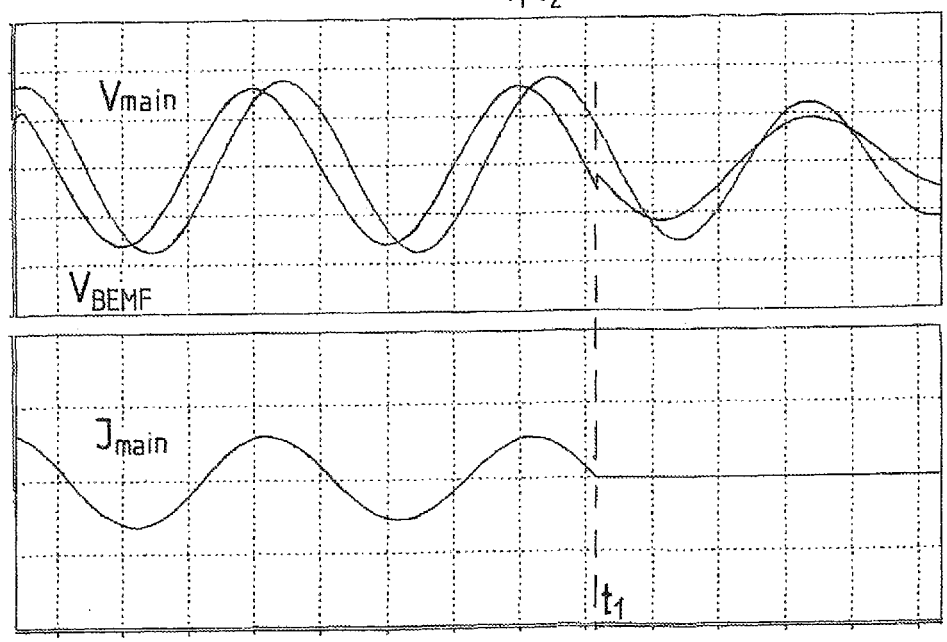

METHOD FOR ACTIVATING AN ASYNCHRONOUS MOTOR

CROSS-REFERENCE TO RELATED APPLICATIONS

This application is a Section 371 of International Application No. PCT/EP2008/006103, filed Jul. 25, 2008, which was published in the German language on Feb. 5, 2009, under International Publication No. WO 2009/015826 A1 and the disclosure of which is incorporated herein by reference.

BACKGROUND OF THE INVENTION

The invention relates to a method for activating an asynchronous motor with electronic switches for rotational speed change.

Typically, asynchronous motors are used for applications of a small power, for example up to two hundred Watts, as are applied for the drive of centrifugal pumps, for example heating circulation pumps and likewise. Thereby, it is mostly the case that monophase and biphase asynchronous motors are fed by the mains in a monophase manner. The rotational speed of these motors thereby is dependent on the mains frequency.

For the control of the rotational speed, it is known to connect parts of the auxiliary winding in series with the main winding. It is counted as belonging to the state of the art to connect frequency converters in series for a quasi stepless change in the rotational speed, but these are complicated and expensive. A change of the rotational speed may also be created by way of a suitable an activation of electronic switches, typically triacs, with which a phase-angle control is effected. The problem of such phase-angle controls lies in the fact that the lag angle, thus the angle after which the switch is switched on again after running through the zero point of the supply voltage, in order to supply the motor with voltage, may only be varied within tight limits. Small lag angles have little influence on the effective value (RMS-value) of the voltage, whereas large lag angles influence the power factor of the motor in an unallowable manner. This problem is compounded with an increasing power of the motor. Moreover, the power which is brought into the motor is also reduced with an increasing lag angle.

Alternatively to this, it is counted as belonging to the state of the art to carry out the rotational speed control with the help of a pulse-cascade control. Here, half-waves of the supply voltage of the main winding are cut away by way of the triacs, by way of a switch lying in series with the main winding being suitably activated in an opening manner. As can be understood, one may not filter out an infinite amount of part-waves of the supply voltage, since then the motor would not be adequately supplied, and would no longer run at a constant speed. This, in particular with wet running centrifugal pump assemblies, may lead to the undesirable formation of noise, which is not desirable on account of the fluid coupling into the conduit network, thus for example into the heating installation. This effect too increases with an increasing motor power.

A toggling method, with which the main winding is connected in series to a part of the main winding, depending on the rotational speed to be activated, is much more favourable as far as this is concerned. An almost infinite control of the rotational speed may be effected by way of this, depending on the number of winding parts and of the switches which are assigned to these. This, depending on the rotational speed to be set, however requires a constant switching between the winding parts which are connected in series to the main winding. This method, particularly with regard to the formation of noise and the influence on the power factor, is much more favourable than the previously described phase-angle control or pulse cascade control which were described previously, but comes up against its limits in particular with motors of a greater power, since current peaks arise in the winding with each switching, which burden the mains and the motor.

Against this background, it is the object of the invention to provide a method for activating an asynchronous motor, which largely avoids the previously mentioned disadvantages, and may be applied in particular also with motors of a greater power.

BRIEF SUMMARY OF THE INVENTION

The method according to the invention for activating, in particular for the rotational speed control of an asynchronous motor, assumes an asynchronous motor with at least two windings, with which for the purpose of a change in the rotational speed, connects a first winding and at least one second winding by way of at least two electronic switches, wherein, on switching, both switches are opened or are held opened for one or more time intervals. Thus the method according to the invention has the effect that on switching, this is not effected in a quasi adhoc manner in the zero point of the supply voltage, as with the state of the art, for example by way of connecting the first winding to the second winding in series for the reduction of the rotation speed, or vice versa for increasing the rotational speed, but on switching, both switches, thus in particular the switch which connects the first winding to the supply voltage, are activated in an opening manner for one or more time intervals. By way of this, the high current peaks which otherwise arise in the motor may be avoided, and a certain adaptation to the voltage level which prevails at the first winding after the switching is achieved.

Time interval in the context of the invention thereby is typically to be understood as a time interval between 5° and 180° of a wavelength)(360° of the supply voltage. If, and this being advantageous, the two switches are opened over several time intervals, then this is effected advantageously in 2 to 20, preferably up to 10 steps. Then the time interval typically varies between 9° and 108° with respect to a wavelength) (360° of the supply voltage.

The method according to the invention may be applied to asynchronous motors which are supplied in a monophase as well as polyphase manner, and is suitable for motors of a smaller power as well as in particular a larger power. The method according to the invention in particular permits the control of the rotational speed of asynchronous motors, compliant with the power factor, with powers above five hundred Watts whilst using simple electronic switches, in particular triacs, without the expensive series connection of a frequency converter.

With regard to the two switches, of which, according to the invention, on switching, both are opened or kept open for one or more time intervals, typically the switch which before the switching connects the first winding to a further winding, is completely, i.e. permanently opened, whereas the further switch which typically connects the first winding to the supply voltage, is opened for one or more time intervals, before this is constantly closed after the switching procedure.

According to an advantageous formation of the invention, the opening of the one switch for one or more time intervals on switching forms part of a phase-angle control, whose lag angle is changed in steps. Thus on switching, one applies the principle of the phase-angle control, in order to adapt the voltage level prevailing at the first winding, to the voltage level which prevails at the first winding after the effected switching, i.e. largely avoiding the current peaks known from the state of the art. It is to be noted that for activating a certain rotational speed of the motor, a more or less constant switching may be necessary, as is known per se from the state of the art on switching the windings to and fro (toggling). The adaptation according to the invention, then with each switching procedure, is effected independently of whether this switches the first winding to a higher voltage level or to a lower voltage level.

The phase-angle control according to the invention may be effected in a simple manner with electronic switches which are known, in particular triacs, wherein for this, usefully the triac which lies in series with the first winding is accordingly activated, that is to say the first winding is supplied with a higher voltage level.

The method according to the invention may be particularly advantageously applied with asynchronous motors which are mains-fed in a monophase manner, since these with this may be controlled in rotational speed whilst using simple triacs, without having the large current peaks within the motor winding, which occur in particular with motors of a greater power on account of the switching procedures. With such motors, the first winding, according to the invention, advantageously forms the main winding, whereas the second and, as the case may be, further windings form, parts of the auxiliary winding or the auxiliary winding. Then in a manner known per se, the second or also further windings are connected in series with the first winding by way of the switches, in order to achieve a rotational speed reduction or vice versa.

According to the invention, one may provide further windings which may be connected in series with the first winding for the purpose of rotational speed variance, wherein an electronic switch, in particular a triac, with which this winding may be connected to the first winding, in particular may be connected in series, is allocated to each of these windings.

According to a further formation of the invention, on switching, i.e. on connecting one winding to the first or with the reverse switching procedure, the phase-angle control is always carried out with the switch which subjects the first winding to the greater voltage.

It is to be understood that on providing several auxiliary winding parts, for example three auxiliary winding parts with three electronic switches which are assigned to these and with a further switch which is assigned to the first winding, a switch assigned to the auxiliary winding parts may also serve for phase-angle control, if for example one switches between two auxiliary winding parts.

In order to fashion the switching procedure as uniformly as possible, in particular whilst avoiding greater current peaks within the winding, according to a further formation of the invention, one envisages activating the phase-angle control with a lag angle dropping to zero, when switching to a higher voltage prevailing at the first winding. Thus the time intervals, in which the switch supplying the first winding with voltage remains opened, is shorted in steps to 0, until therefore the greater voltage prevails fully at the first winding.

In the reverse case, if on switching, one activates to a lower voltage prevailing at the first winding, the phase-angle control is effected with a lag angle increasing to a predefined value. This predefined value of the lag angle is selected such that thereby, an effective voltage is produced, which corresponds essentially to the voltage which prevails constantly at the first winding after the switching.

If on switching, one switches to a lower voltage prevailing at the first winding, then according to a further formation of the invention, instead of a phase-angle control, one may select the time interval, after which one of the two opened switches is closed again, advantageously in dependence on the voltage induced in the first winding. The switching procedure is therefore advantageously activated not depending on time, but in dependence on the voltage induced in the first winding. Unallowably high current peaks in the motor winding may be reliably avoided when activating to a lower rotational speed, by way of this method according to the invention.

Advantageously, on switching to a lower voltage prevailing at the first winding, the first winding is separated from the voltage supply until the voltage induced in the first winding has dropped to the magnitude of this lower voltage prevailing after the switching procedure. This method has the advantage that on the one hand unallowably high current peaks in the winding are avoided, and on the other hand that the first winding is separated from the voltage supply only for as long as is really necessary.

The method according to the invention is advantageously not only used for switching to rotational speeds of the motor which result on connecting the individual winding parts to one another, but in a targeted manner for also activating rotational speeds lying therebetween. If therefore for example a rotational speed is to be activated, which lies between rotational speeds resulting with the connection of two part windings, then a quasi constant switching is necessary. It is indeed with this constant switching, that the method according to the invention is particularly advantageous, since the power factor of the motor is significantly improved and in particular also the heat arising in the winding on account of the switching procedures is significantly reduced.

The method according to the invention permits in particular the simple and inexpensive rotational speed control for asynchronous motors which are mains fed in a monophase manner, with powers of more than five hundred Watts, without the application of a costly frequency converter. However, with the method according to the invention, one may also control the rotational speed of asynchronous motors which are fed in a three-phase manner. Basically, the method according to the invention is not limited to the application of the asynchronous motor, but the method is particularly advantageously applied for wet-running motors of centrifugal pumps, since one may also achieve a significant noise reduction on account of the softer switching procedures.

A precondition for the implementation of the method according to the invention is an asynchronous motor with which at least two windings may be connected to one another by way of two electronic switches, in particular triacs, for the purpose of the change in the rotational speed. For activating the triac according to the desired rotational speed, the asynchronous motor comprises an electronic control, which is formed for carrying out the method according to the invention. Typically, with regard to the control, it is the case of a digital control, wherein the method according to the invention is advantageously implemented into the control with regard to software. Particularly advantageously, with the asynchronous motor, it is the case of a motor which is fed in a monophase manner, with a centrifugal pump assembly, and whose main winding is formed by the first winding, and whose auxiliary winding is formed by the second or further winding, as is known per se with asynchronous motors of this type. By way of the implementation of the method according to the invention into the control of the asynchronous motor, one may control the rotational speed of asynchronous motros with an electrical power uptake of more than five hundred Watts, preferably even more than 1 kW, whilst using simple switches, in particular triacs, without unallowably influencing the power factor, and with a comparatively low noise emission, which is thus predestined for the application in combination with wet-running motors, as are typically applied for drive of circulation pumps.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

The invention is hereinafter described in more detail by way of embodiment examples represented in the drawing. There are shown in the drawings:

FIG. 7 is a the effective voltage at the main winding on switching, with different switching methods, and therebelow, the respective lag angle; and FIG. 8 is a the voltage prevailing at the main winding, as well as the voltage induced in the main winding and, therebelow, the current flowing in the main winding on switching.

DETAILED DESCRIPTION OF THE INVENTION

Figure 1:
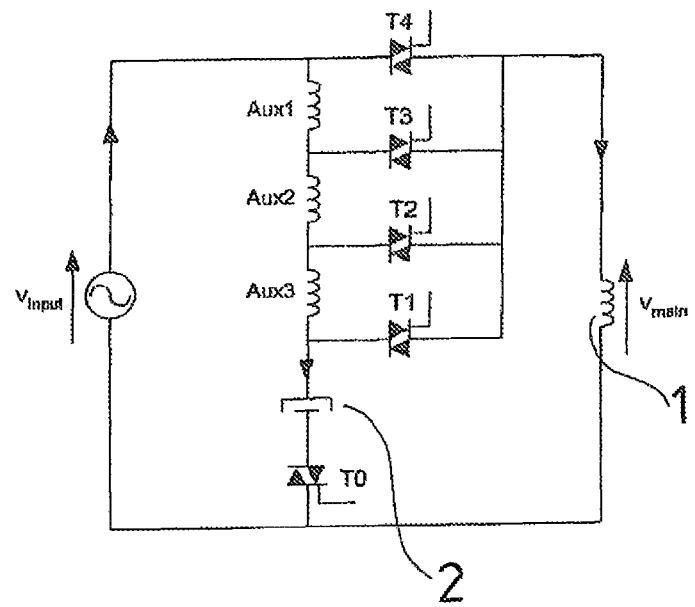
FIG. 1 is a simplified circuit diagram of an asynchronous motor which is mains-fed in a monophase manner, with a main winding and an auxiliary winding.

The asynchronous motor represented by way of FIG. 1 comprises a first winding 1 which forms the main winding, as well as an auxiliary winding which consists of three part windings Aux1, Aux2 and Aux3, which are connected in series to a capacitor 2, and to an electronic switch in the form of a triac T0, and, as the circuit diagram according to FIG. 1 shows, lie at the mains supply voltage $V_{Input}$ parallel to the main winding 1. In each case, electronic switches in the form of triacs T1, T2 and T3 are assigned to the auxiliary windings Aux1, Aux2 and Aux3, with which triacs the auxiliary winding may be connected in series to the main winding 1 in a complete or partial manner.

Furthermore, a switch T4 is provided, which lies in series with the main winding and separates the main winding 1 from the supply voltage or connects it to this. Apart from the switch T0, which on operation of the motor is constantly closed and is necessary for switching off the motor, on operation of the switches T1 to T4, one is closed and the other three are opened. The rotational speed of the motor may be controlled by way of switching.

The motor runs with a maximal rotational speed with a closed switch T4 if the supply voltage $V_{Input}$ prevails at the main winding 1. With a dropping rotational speed, the motor is activated by way of closing the switches T3 or T2 and finally T1. In the later case, the complete auxiliary winding is connected in series to the main winding 1 and thus the lowest possible voltage prevails at the main winding. By way of switching between the switches T1, T2, T3, T4, the motor may be operated at quasi any rotational speed between the rotational speeds which result in the end positions, in each case with closed switches T1 to T4, which is counted as belonging to the state of the art.

In particular, with motors of a large power, comparatively large peak currents arise in the main winding 1 when switching the rotational speed, i.e. for example on opening the switch T3 and simultaneous closure of the switch T4 in the zero point of the supply voltage. In order to avoid this, with the method according to the invention, one does not switch quasi simultaneously in the zero-crossing of the voltage supply $V_{Input}$ as with the state of the art, but in a quasi stepped manner, as is shown in detail by way of the FIGS. 3 to 6.

Figure 3:
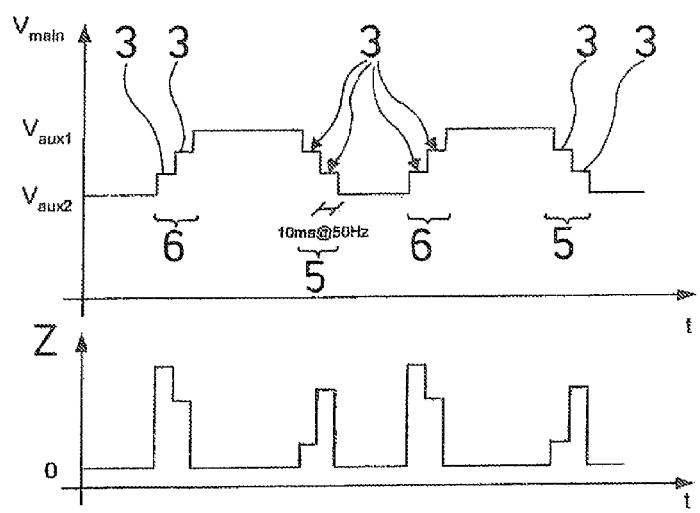
FIG. 3 is the effective voltage at the main winding, before, during and after the switching, and below, the respective lag angle of the phase-angle control.

With the first switching procedure represented on the left on the time axis in FIG. 3, the voltage $V_{Aux2}$ which prevails at the main winding 1 and which results with a closed switch T2, is lifted in steps to the higher voltage $V_{Aux1}$ which prevails at the main winding 1 after the switching procedure and which results when the switch T3 is closed and the switches T1, T2 and T4 are opened.

For switching, at the zero crossing of the supply voltage $V_{Input}$, the switch T2 is opened and the switches T1 and T4, unchanged, remain open, but the switch T3 also firstly remains opened on account of the phase-angle control of this switch. The phase-angle control is effected such that the effective value of the voltage (RMS-value) is adapted in steps to the voltage prevailing at the main winding 1 after the switching, as results with a closed switch T3. The switch T3 is thus activated by the phase-angle control in three steps 3 with a lag angle which drops to zero on controlling up, as is evident by way of FIG. 3. In this manner, the main winding is not subjected ad hoc to the higher voltage $V_{Aux1}$, as with the state of the art, but quasi in a stepped manner. The steps 3 are temporally determined by the frequency of the supply voltage which is usually 50 Hz, so that each step 3 lasts for a time interval of 10 ms. In the embodiment example represented by way of FIG. 3, the switching up is effected in two intermediate steps, i.e. after 20 ms the switching procedure is completed, and the main winding 1 is supplied with the higher voltage $V_{Aux1}$. In FIG. 3, only two steps of the phase-angle control are shown by way of example, but the more stages 3 or steps 3 are be selected on switching 3, the softer does the switching procedure become, i.e. the less current peaks occur within the motor winding 1.

With the switching sequence represented by way of FIG. 3, after a certain time, a switching from $V_{Aux1}$ to $V_{Aux2}$ is effected in the reverse manner by way of the switch T3 being opened and the switch T2 being closed. This too is effected in steps 3, here for example two steps 3. On switching to a lower voltage, here $V_{Aux2}$, the switch T2 firstly remains opened, but additionally the switch T3 is opened, and specifically firstly only briefly, thus for a short time interval, which is selected such that an effective voltage results at the winding 1, which lies below the voltage $V_{Aux1}$ but still significantly above $V_{Aux2}$. This is effected in the same manner with phase-angle control, as described above. However, on switching down to a lower voltage, differently than switching up, one operates with a phase-angle control with which the lag angle is selected increasing from zero to a predefined value. Thereby, this predefined value is selected such that an effective voltage results, which corresponds roughly to the voltage to which one is two switch down, thus here $V_{Aux2}$. As is to be pointed out by way of FIG. 3, in which in total, four switching procedures are represented in a comparatively short time interval, by way of this switching to and fro (toggling) between the switches T2 and T3, one achieves a voltage level at the main winding 1, which averaged over time, lies between $V_{Aux1}$ and $V_{Aux2}$ and thus activates a rotational speed lying therebetween.

Figure 4:
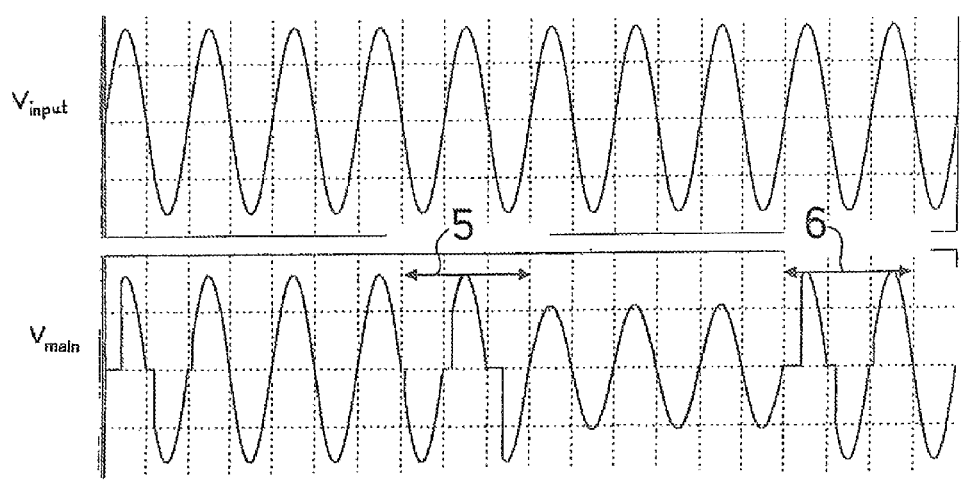
FIG. 4 is the voltage course of the supply voltage, and therebelow, the voltage course at the main winding before, during and after the switching.
Figure 5:
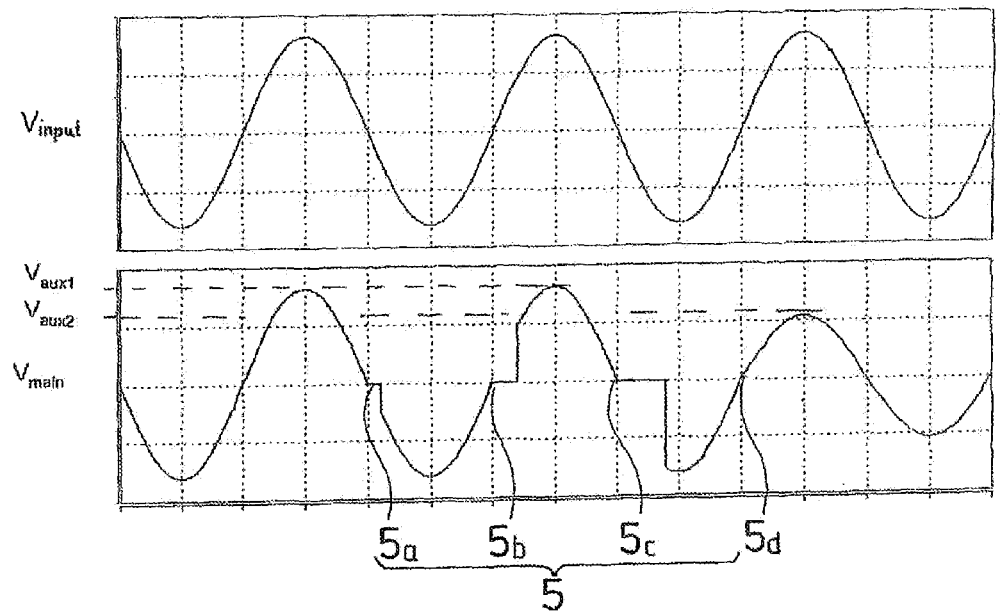
FIG. 5 is the voltage course of the supply voltage and the voltage course at the main winding on switching to a lower voltage level.
Figure 6:
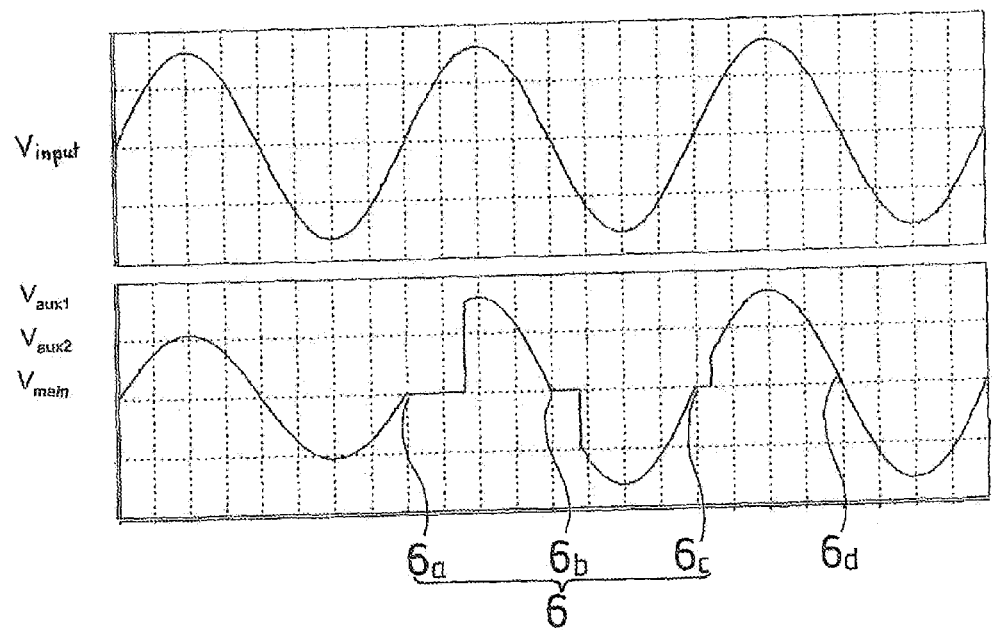
FIG. 6 is in a representation according to FIG. 5, the switching to a higher voltage level.

It is represented by way of FIG. 4, as to how the voltage $V_{main}$ prevailing at the main wing 1 behaves compares to the supply voltage $V_{Input}$ with these switching procedure as are represented by way of FIG. 3, wherein the switching procedure 5 shows the switching down from $V_{Aux1}$ to $V_{Aux2}$, whereas the switching procedure 6 represents the subsequent switching up. FIG. 5 represents how the voltage course looks in detail when switching down, and FIG. 6 shows the respective voltage course on switching up, in each case for comparison always with a supply voltage $V_{Input}$ shown above, and the voltage $V_{main}$ resulting in the main winding 1 shown below.

As FIG. 5 makes clear by way of example, the switching down is effected in three steps 3 by way of phase-angle control. With the first switching procedure 5a, the switch T3 (with an opened switch T2) is still switched on in a delayed manner for a yet very short time interval, specifically for about 18° with respect to the wavelength)(360° of the supply voltage $V_{Input}$, so that an effective value of the voltage results, which firstly lies slightly below $V_{Aux1}$. At the switching time point 5b which follows, this temporal lag is increased by the phase-angle control, thus this lag angle is increased here to roughly 36°. In the third step, then at the time switching point 5c, a further switching-on lag of about 72° is once again carried out, so that here the voltage level is led down from $V_{Aux1}$ to $V_{Aux2}$ in three steps. Then finally in the switching time point 5d, the switch T3 is opened and the switch T2 is simultaneously closed, so that $V_{Aux2}$ prevails at the main winding 1 from then on.

On switching up, this is effected in essentially the reverse direction. The respective switch time points 6a to 6d are drawn in FIG. 6. On switching up to a greater voltage level however, firstly the switch T2 is opened which previously supplied the voltage supply for the main winding 1. The switch T3 with the next highest voltage level lying thereabove remains opened in the time point 6a, but however is already activated by phase-angle control, and specifically firstly with a comparatively large lag angle here of 76°, in order to produce an effective voltage which only slightly lies above the previous voltage $V_{Aux2}$. Here then, in the reverse manner, a reduction of the lag angle dropping from Z to 0 is effected, until thus the switch T3 at the time point 6d is constantly closed, and the remaining switches T1, T2 and T4 are opened.

As the switching procedures represented by way of FIGS. 7 and 8 illustrate, the switching down to a low voltage level may also be effected in a manner which is different to phase-angle control, specifically by way of determining the voltage induced in the main winding 1 and comparing it to the voltage $V_{Aux2}$ which prevails at the main winding 1 after the switching procedure. This lag time which is characterised at 3a in FIG. 7, is not predetermined, but is defined by the course of the induced voltage in the first winding 1. FIG. 8 in the upper diagram shows the voltage $V_{main}$ which prevails at the main winding 1, as well as the voltage $V_{BEMF}$ which is induced in the main winding and which lags this. The switching point in time $t_1$ when the switch T3 is likewise opened given opened switches T1, T2 and T4, is clearly visible, after which current no longer flows in the winding, as is evident in the lower diagram of FIG. 8. Now the induced voltage $V_{BEMF}$ which arises in the main winding is measured, and one waits until this voltage has dropped to the value $V_{Aux2}$. As soon as this is the case, and this point in time is characterised at $t_2$, the switch T2 is activated to close, and from now on, the main winding 1 is supplied with the voltage $V_{Aux2}$ until one subsequently switches up again. As FIG. 7 shows, the time interval 3a between $t_1$ and $t_2$ in this embodiment example is almost 180°, thus almost half the wavelength of the supply voltage $V_{main}$.

Although the switching up and down by way of activating the switch T2 and T3 is described in the above embodiment example according to the circuit diagram according to FIG. 1, it is to be understood however that a switching between T1 and T2 as well as between T3 and T4 may be effected in an analogous manner. The phase-angle control is always effected with the switch which leads the higher voltage to the first winding 1.

Moreover, an improvement of the motor may yet further be achieved by way of connecting a further capacitor with a switch lying in series thereto, parallel to the capacitor 2 and the switch T0 in the auxiliary winding branch according to FIG. 1. In this manner, the capacitance may be adapted according to the voltage prevailing at the main winding 1, so that different capacitances are available for different rotational speeds. One may realise three capacitance variants with two parallel capacitors, and these variants may be switched by the control according to the respective prevailing voltages.

Figure 2:
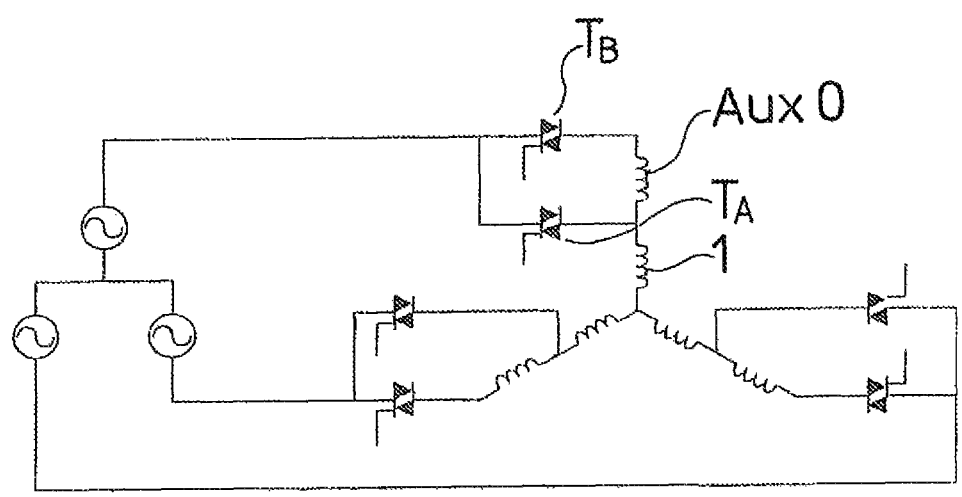
FIG. 2 is a simplified circuit diagram of an asynchronous motor which is fed in a three-phase manner.

The method according to the invention has been described by way of an asynchronous motor according to FIG. 1, which is mains fed in a monophase manner. This method may also be applied with motors which are mains-fed in a three-phase manner, thus three-phase asynchronous motors, as is represented by way of example by way of FIG. 2. The first winding 1 may be supplemented by additionally connecting a further winding Aux0. For this, again two switches, specifically the switches TA and TB are provided. For a better overview, only one branch of this three-phase asynchronous motor which is connected in a star circuit, is shown. The switching by way of the switching connection of the windings Aux0 or switching off the winding Aux0, is effected in an analogous manner as is described above and the method may be designed accordingly in all three branches. The method is not limited to three-phase motors in a star circuit, but may also be applied accordingly in a triangle circuit and then the windings 1 and Aux0 in each case lie in one side of the triangle, wherein the switches TA and TB connect the one phase of the mains supply to a point of the triangle, and the other switch to a point between the windings 1 and Aux0 (triangular circuit not shown). In a simplified form, the method according to the invention may also be effected with a three-phase motor in a star circuit, with which two of the three windings in each case are connected via a switch to the corresponding phase of the mains supply, so that the windings may be switched on and off in an analogous manner.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for activating an asynchronous motor comprising a first winding and one or more second windings, wherein for the purpose of rotational speed change a first switch is provided that decouples the first winding from the one or more second windings when closed, and one or more second switches are provided that couple at least one of the one or more second windings in series with the first winding when closed and the first switch is open, the first switch and the one or more second switches being arranged in parallel relative to each other, wherein for switching from an initial effective voltage prevailing at the first winding resulting from a closed state of an initial switch selected from the first switch and the one or more second switches to a final effective voltage prevailing at the first winding resulting from a closed state of a final switch selected from the first switch and the one or more second switches, the initial and final switches are activated into opening for one or more time intervals during a switching period such that an effective voltage prevailing at the first winding during the switching period is between the initial and final effective voltages and is changed in a stepped manner from the initial to the final effective voltage.

2. A method according to claim 1, wherein the opening of the initial and final switches is part of a phase-angle control, whose lag angle is changed in a stepped manner.

3. A method according to claim 2, wherein the phase-angle control is effected by way of the first switch, which is a triac.

4. A method according to claim 2, characterised in that the phase-angle control is carried out with the first switch which subjects the first winding to the higher effective voltage.

5. A method according to claim 2, characterised in that on switching to a higher effective voltage prevailing at the first winding, the phase-angle control is activated with a lag angle which drops to zero.

6. A method according to claim 2, characterised in that on switching to a lower effective voltage prevailing at the first winding, the phase-angle control is activated with a lag angle which increases to a predefined value.

7. A method according to claim 1, characterised in that the first winding forms the main winding of an asynchronous motor which is mains-fed in a monophase manner, and the at least one second winding forms a part of the auxiliary winding or the auxiliary winding.

8. A method according to claim 1, wherein at least two second windings are provided, which for the purpose of rotation speed variance, may be connected in series to the first winding, wherein each of the at least two second windings is assigned to one of the one or more second switches, which are triacs.

9. A method according to claim 1, characterised in that on switching to a lower effective voltage prevailing at the first winding, the switching procedure is activated in dependence of the voltage induced in the first winding.

10. A method according to claim 1, characterised in that on switching to a lower effective voltage prevailing at the first winding, the first winding is separated from the voltage supply until the voltage induced in the first winding has dropped to the magnitude of this lower effective voltage.

11. A method according to claim 1, characterised in that it is applied for producing motor rotational speeds which lie between the rotational speeds which result with a fixed connection of the motor windings.

12. An asynchronous motor with a first winding and one or more second windings, wherein for the purpose of rotational speed change a first switch is provided that decouples the first winding from the one or more second windings when closed, and one or more second switches are provided that couple at least one of the one or more second windings in series with the first winding when closed and the first switch is open, the first switch and the one or more second switches being arranged in parallel relative to each other, and with an electronic control for carrying out the method according to claim 1.

13. An asynchronous motor according to claim 12, characterised in that it is a motor of a centrifugal pump assembly, which is fed in a monophase mariner and whose main winding is formed by the first winding and whose auxiliary winding is formed by the one or more second windings.

14. An asynchronous motor according to claim 12, characterised in that it has an electrical uptake of power of more than five hundred watts, preferably more than one kilowatt.

* * * * *